Figure 1:
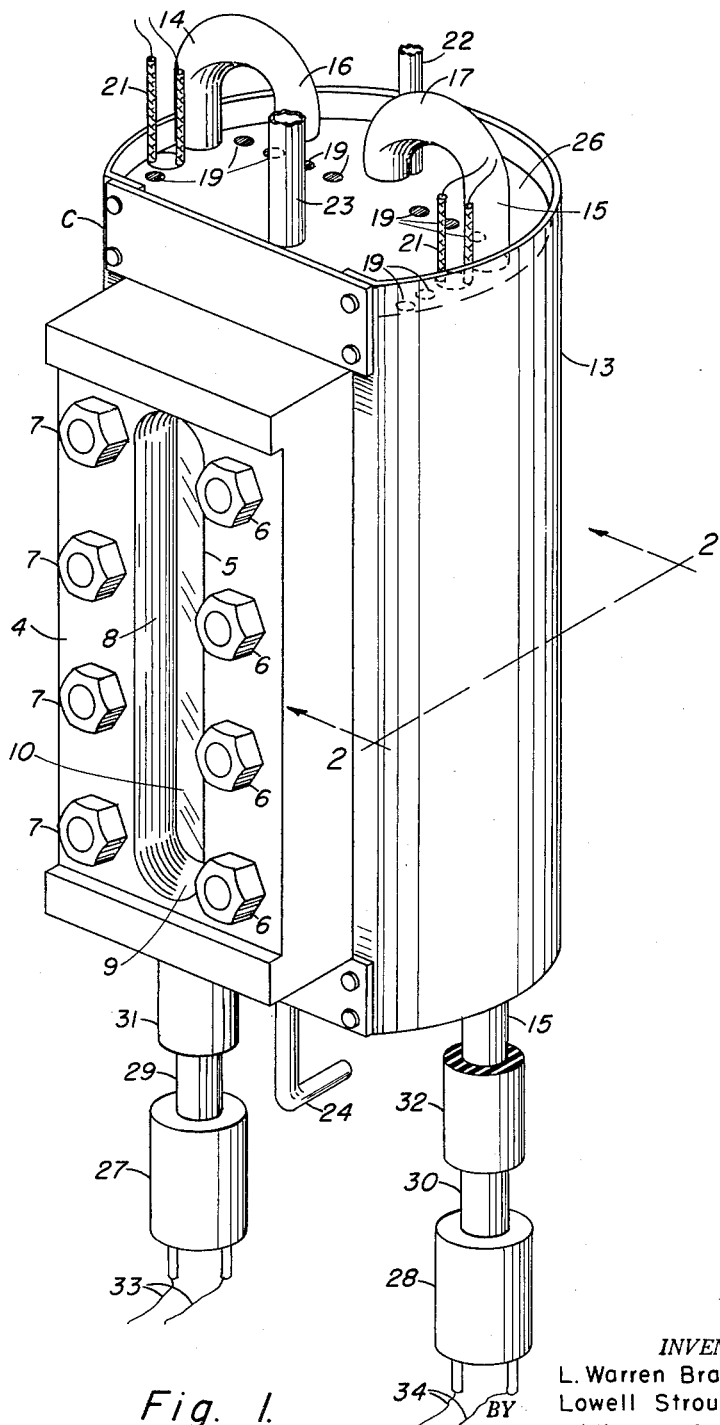

INVENTOR.
L. Warren Brandt
Lowell Stroud
William M. Deaton

April 3, 1962 L. W. BRANDT ETAL 3,027,750
APPARATUS FOR STUDYING PHASE RELATIONSHIPS
OF GASES AND GAS MIXTURES
Filed Feb. 24, 1959 5 Sheets-Sheet 3

INVENTOR.
L. Warren Brandt
Lowell Stroud
BY William M. Deaton
ATTORNEY

April 3, 1962 
L. W. BRANDT ETAL 
3,027,750
APPARATUS FOR STUDYING PHASE RELATIONSHIPS
OF GASES AND GAS MIXTURES
Filed Feb. 24, 1959
5 Sheets-Sheet 4

INVENTOR.
L. Warren Brandt
BY  Lowell Stroud
William M. Deaton
ATTORNEY

April 3, 1962 L. W. BRANDT ET AL 3,027,750
APPARATUS FOR STUDYING PHASE RELATIONSHIPS
OF GASES AND GAS MIXTURES
Filed Feb. 24, 1959 5 Sheets-Sheet 5

INVENTOR.
L. Warren Brandt
Lowell Stroud
William M. Deaton
BY
Donald G. Welsh
ATTORNEY United States Patent Office 3,027,750
Patented Apr. 3, 1962

3,027,750
APPARATUS FOR STUDYING PHASE RELATIONSHIPS OF GASES AND GAS MIXTURES
Luther Warren Brandt, Lowell Stroud, and William M. Deaton, Amarillo, Tex., assignors to the United States of America as represented by the Secretary of the Interior
Filed Feb. 24, 1959, Ser. No. 795,298
10 Claims. (Cl. 73—17)
(Granted under Title 35, U.S. Code (1952), sec. 266)

The invention herein described and claimed may be manufactured and used by or for the Government of the United States of America for governmental purposes without the payment of royalties thereon or therefor.

This invention relates to an improved constant temperature chamber.

Many of the studies of vapor-liquid equilibria in gases and gas mixtures have been made up to now by using apparatus which did not permit direct visual observation of the interior of the experimental cell chamber. As a result, much time was wasted in collecting and analyzing samples which were later found to have been contaminated with the unwanted phase, particularly when attempting to obtain phase equilibria data at or near the dew points and the bubble points of the gases under study. Attempts to avoid contamination in a gas sample of one phase by another have been often unsuccessful. One method proposed, involving a thermal conductivity technique, gives indication of actual phase separation in the cell for the region around fifty percent condensed. However, this method fails under conditions near the dew point and bubble point. A cell with a suitable observation window, which would allow visual observation of the cell contents during experimentation, would allow the operator to withdraw uncontaminated samples simply and directly. Several "optical" cells which permit visibility of their contents have been described in the literature. None, however, are suitable for the low temperatures and high pressures under study, and the multicomponent systems involved in natural gas mixtures.

Temperature control of equilibrium cells described heretofore is generally not sufficiently flexible to cover a broad range of conditions. The system generally employed maintains the cell at a constant temperature coincident with the normal boiling point of various liquefied hydrocarbon mixtures, the sublimation temperature of carbon dioxide, or the boiling point of liquid air or liquid nitrogen at atmospheric pressure. For other low temperatures, a stirred liquid bath, such as that described by Walters and Loomis, J.A.C.S., vol. 47, page 2302 (1925), is employed. This method, however, is rather inconvenient, and is limited as to temperature range. For a systematic study of the phase relationships of gases and gas mixtures throughout a wide temperature range, studies must be carried out at series of selected temperatures. The use of hydrocarbon mixtures boiling at the desired temperature, although commonly employed, is unsatisfactory because with the passage of time, the mixture becomes enriched in the higher boiling constituents with the concomitant raising of the boiling point. Furthermore, the use of highly inflammable hydrocarbons presents a serious fire hazard.

It is the main object of this invention to provide an improved apparatus for obtaining phase equilibrium data on gas and gas mixtures rapidly and accurately over a broad range of conditions.

It is an object of this invention to provide an equilibrium cell having a window for visual observations for determining phase equilibria for multicomponent systems.

It is a further object of this invention to provide an equilibrium cell, the temperature of which can be accurately maintained at any predetermined value.

It is a further object of this invention to provide an equilibrium cell wherein a constant low temperature is automatically maintained by heat exchange with liquefied gas or gas mixtures.

It is a further object of this invention to provide heating means in conjunction with an equilibrium cell for rapidly raising the temperature therein when desired.

It is a further object of this invention to provide means for obtaining equilibrium conditions rapidly in an equilibrium cell chamber.

Further objects will become apparent from the description of the invention as given in the specification and drawings.

The present invention consists of a rectangular chamber having metal sides, one face of the chamber being covered by a transparent glass plate, thick enough to withstand the pressures contemplated. A gas inlet and vapor and liquid outlets are provided in the chamber, the vapor outlet also accommodating a stirring rod stem. Thermocouples are provided in the cell assembly for temperature measurement and control. Coolant tubes surround the chamber, as well as a pair of electrical heaters, these being imbedded in solder to unitize the structure and improve heat transfer characteristics.

Coolant such as liquid air is forced by a simple percolator-type pump through coolant delivery tubes and return to a coolant reservoir through coolant return tubes. Cell temperature is maintained at any desired value, from room temperature to the boiling point of the coolant used, by means of a relay circuit of conventional design. Coolant liquid level is maintained in the reservoir automatically by a liquid-level operated switch. The cell contents are stirred during a run by a magnetic stirrer which may be activated satisfactorily by a Thyratron circuit.

The general system employed in determining phase equilibria data with the present invention is the "once-through flow" method of Steckel and Zinn described in J. Chem. In. (U.S.S.R.), vol. 16 (1939), page 24. Their system was limited, however, to temperatures near or above atmospheric ambient temperatures. The window cells of the prior art so far as is known, were all designed to be used in the "dew point-bubble point" method of determining phase equilibria data, which is limited to binary systems only, and could not be employed for the study of multicomponent systems.

Figure 2:
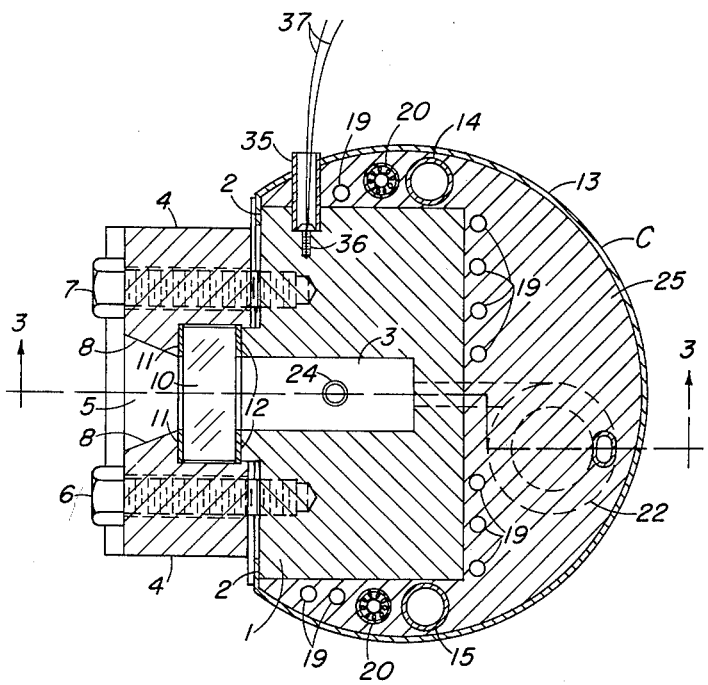
Figure 3:
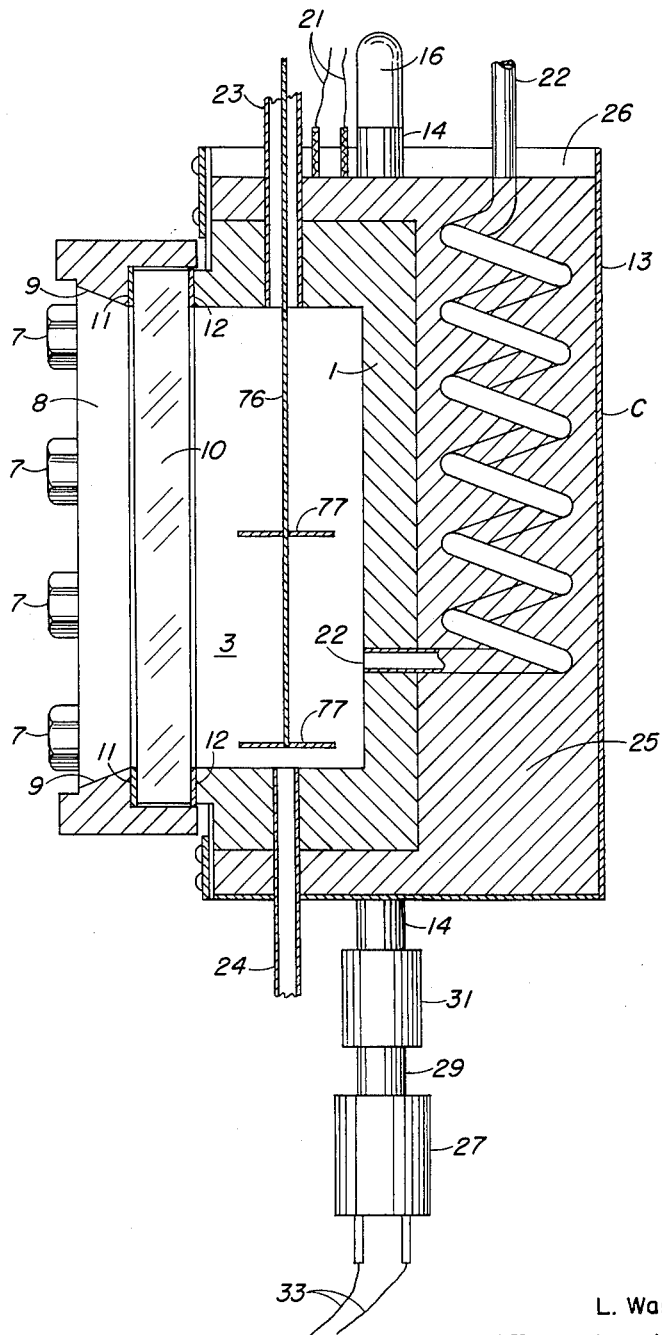
Figure 4:
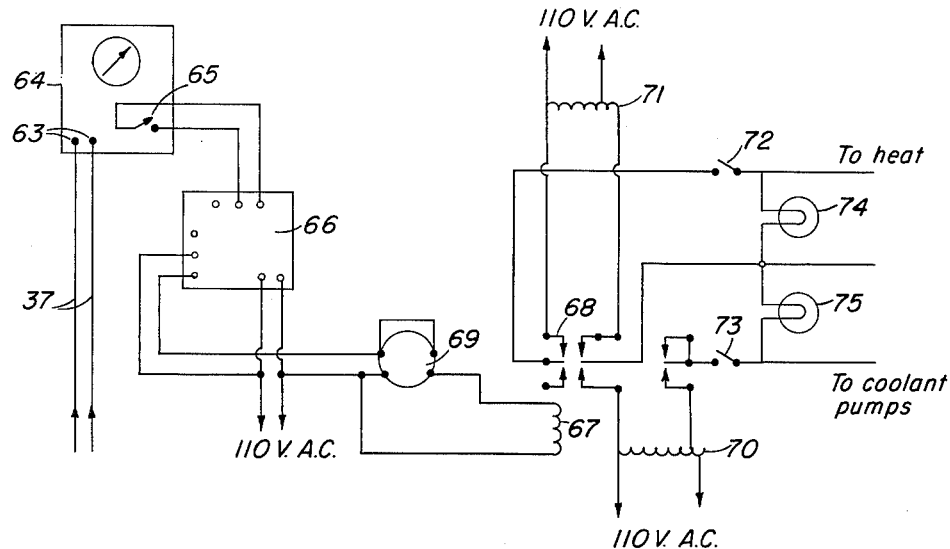
Figure 5:
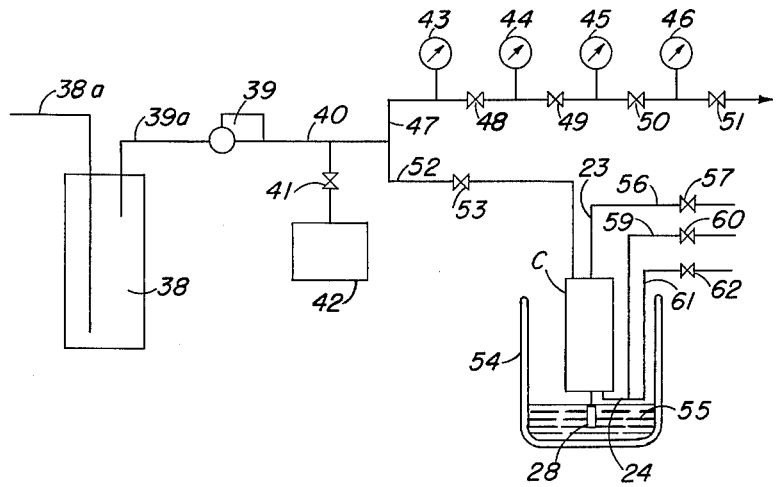
Figure 6:
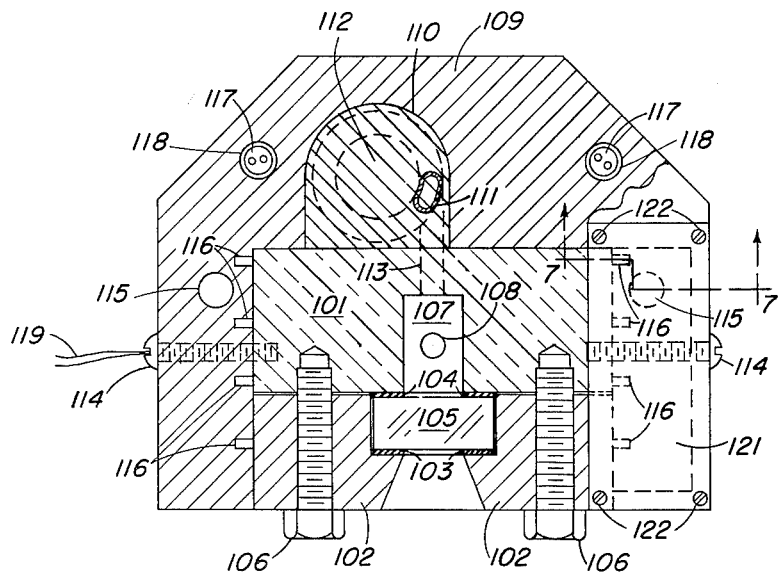
Figure 7:
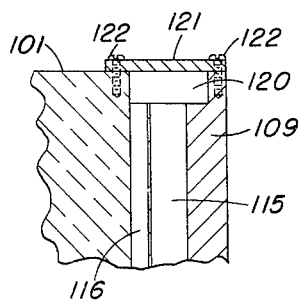

In the drawing:
FIGURE 1 is a perspective view of the temperature cell.
FIGURE 2 is a horizontal section of the cell taken along line 2—2 of FIGURE 1.
FIGURE 3 is a vertical section of the cell taken along line 3—3 of FIGURE 2.
FIGURE 4 is a circuit diagram of the automatic temperature control system.
FIGURE 5 is a diagrammatic outline of the gas flow system.
FIGURE 6 is a view, mostly in cross section, of one modification of the cell.
FIGURE 7 is a vertical section taken along line 7—7 of FIGURE 6.

The equilibrium cell C comprises, as best shown in FIGURE 3, a rectangular block of metal 1, such as brass, having a flat front face 2 (FIGURE 2) and a rectangular cut out chamber portion 3. A face plate 4 having a tapered opening 5, is fastened to block 1 by bolts 6 and 7. Opening 5 has generally vertical sides 8 and curved upper (hidden in FIG. 1) and bottom portions 9. A window 10, of suitable strength and thickness to withstand the pressures employed, is mounted between face plate 4 and block 1. Fiber gaskets 11 space the glass from face plate 4 and lead gaskets 12 from block 1. By drawing up bolts 6 and 7 tightly window 10 is held in gas-tight relationship against block 1 and chamber 3.

Surrounding block 3 and spaced therefrom at the side and rear is a sheet metal or copper casing 13 extending somewhat above the upper block portion and having a closed bottom portion. Tubes 14 and 15, which may be of copper, brass, or other suitable metal, are spaced near the block and serve as coolant delivery tubes. These upper portions 16 and 17 extend above the casing and are bent downward, terminating near the top of the cell (see FIG. 1). This prevents undue splashing of coolant. A plurality of metal tubes 19 surround block 1, as shown in FIGURE 2, and serve as coolant return tubes. Electrical cartridge-type heaters 20, which in one embodiment were of 100 watt capacity, are spaced adjacent the midportion of block 1, their electrical leads 21 extending above the casing as shown in FIGURES 1 and 3. Gas entry tube 22, which is in the form of a helical coil in order to present more surface area for bringing the inlet gas in equilibrium with cell conditions before entry into the cell chamber, is located somewhat off center, as shown in FIGURE 2. Vapor outlet tube 23 and liquid outlet tube 24 are connected as shown in FIGURE 3 to the upper and lower portion of chamber 3. The space between block 1 and casing 13 is filled with an alloy, such as 50/50 tinlead solder to form a solid mass 25. This serves to unitize the structure and improve heat transfer properties. The upper level 25 is below the upper edge of 13 so that a shallow reservoir 26 is formed. The upper section of coolant delivery tubes 14 and 15, electrical leads 21 and vapor tube 23 extend above the reservoir, as shown in FIGURE 1, while the upper ends of coolant return tubes 19 are flush with the reservoir bottom.

The lower ends of coolant delivery tubes 14 and 15 extend a short distance beneath the bottom of casing 13. Electrical cartridge heaters of low wattage are spaced in heater tubes 27 and 28, which in turn are connected to short pieces of metal tubes 29 and 30, of the same diameter as 14 and 15. In order to minimize heat transfer, the heaters are connected to tubes 14 and 15 by short sections of rubber tubing 31 and 32. Electrical leads 33 and 34 connect the heaters to a power source.

Temperature measurement is accomplished by inserting one or more thermocouples into the block. One suitable arrangement is to have three thermocouples, one each at the top, bottom and midportion of the chamber.

As shown in FIGURE 2, a thermocouple sleeve 35 extends through frozen mass 25 and a short distance into block 1. Screw 36 is threaded into a tapped hole in block 1 beyond the end of sleeve 35. Thermocouple leads or wires 37 are mounted in a hole drilled through the longitudinal center of screw 36 and are fastened to each other and to the end of the screw by silver brazing. This enables the thermocouples to be easily replaced. The thermocouple leads are connected to a recorder-controller of conventional design.

Cooling the cell is accomplished as follows: The cell C is placed in a transparent Dewar flask 54 containing coolant, e.g., liquid air, so that the heaters in 27 and 28, which may be 30 watt units, are completely immersed. This is shown schematically in FIGURE 5. When the heaters are energized, coolant is pumped through tubes 14 and 15 to the top of the apparatus into reservoir 26. It then returns through tubes 19 to the coolant container.

The level of coolant liquefied gas is maintained at a constant level in any convenient manner. An apparatus similar to that described by Quinnel and Futch, Review of Scientific Instruments, vol. 21 (1950), pages 400 and 401, is suitable for transferring coolant from its container to the Dewar flask 54 and maintaining a constant level therein.

Gas Flow Through Cell

The gas flow into the apparatus is shown in FIGURE 5. The gas under study first enters a potassium hydroxide filled trap 38, via line 38a, where carbon dioxide and water are removed. Purified gas leaves 38 via line 39a and enters pressure regulator 39, which maintains the pressure within 0.5% of the desired value. Gas at the desired pressure leaves regulator 39 through line 40 and may be withdrawn through valve 41 to an auxiliary dead weight gage 42, which is used to measure the gas pressures and to calibrate the other gages, 43, 44, 45, and 46 on the gas line 47 branching from line 40. The full scale pressure ranges of these gages in this embodiment vary from 1500 p.s.i.g. at 43 to 300 p.s.i.g. at 46 and have an accuracy of 0.5% of their full scale range. The arrangement of valves 48, 49, 50, and 51 permits reading the cell pressure on the gage having the appropriate range with greatest accuracy. The gas enters equilibrium cell C through line 52 and valve 53. Dewar flask 54, of clear glass, surrounds cell C when the apparatus is in operation, and contains the liquefied coolant material. Vapor phase is removed for sampling through lines 23 and 56, and valve 57. Liquid phase samples are removed through lines 24 and 59, the latter being preferably of small diameter capillary tubing to prevent fractionation of the sample during withdrawal. Line 61 is a liquid drain line and has a control valve 62.

Temperature Control

The thermocouple located near the middle of the cell is used for temperature control and is connected by leads 37 to the input terminals 63 of a recorder-controller 64 (see FIGURE 4). A pair of adjustable contacts 65 actuate a cold cathode relay 66 when the recorder indicates deviation from a predetermined temperature. If the cell warms above the desired temperature the contacts of the recorder close and relay 66 energizes coil 67 of power relay 68, acting through a 10 second time delay relay 69. Use of the latter is advantageous in eliminating chattering and sparking at the contacts of 68. Electrical energy from variable voltage transformer 70 is then supplied to the heaters located in tubes 27 and 28 (see FIGURE 1). These heat up and pump coolant to the reservoir 26 top of the cell in a manner similar to that of a coffee percolator. Cooling continues until the recorder contacts open, whereupon the two electrical heaters 20 imbedded in the cell are actuated by electrical input from variable voltage transformer 71, heating the cell.

In normal operation, however, temperature control is maintained by balancing the heat input to the coolant pumps against the normal heat leak into the cell from its surroundings. Input to the cell heaters 20 is utilized primarily when it is desired to raise the cell temperature rapidly when establishing new experimental conditions. Switches 72 and 73 are provided for interrupting electrical input to either the cell heaters or coolant pumps when desired. Pilot lamps 74 and 75 indicate which circuit is in operation. Temperature control within approximately ±0.5° F. is maintained with this circuit. No significant temperature differential exists between the top and bottom of the cell.

Stirrer Operation

As indicated above, a stirrer 76, having blades 77 integral therewith, is inserted through the vapor outlet line 23 for agitation of the cell contents during a run in order to promote rapid equilibration of the inlet gas. Although various methods may be employed to actuate the stirrer, we have found the Thyratron controlled magnetic method described by Brandt and Deaton in Review of Scientific Instruments, vol. 27, No. 9 (1956), pp. 714, 715, to be satisfactory.

Operation of the Apparatus

To prevent accumulation of dew and frost on the cell during use, a cylindrical plastic shield encloses the portions of the cell and other apparatus projecting above the Dewar flask. The lip of the Dewar flask fits loosely inside this shield. During the initial cool-down of the cell, boil-off of coolant sweeps all moisture-laden air from the system. The slow boil-off of coolant that persists after the cell temperature is established at the desired value prevents flow of moist air from the room into the space surrounding the cell. Thus, all exposed apparatus in the Dewar is kept free of water and ice. A blower prevents accumulation of dew on the outer surface of the Dewar.

A cylinder of the gas to be studied is connected to the gas inlet 38a of the apparatus. The cylinder valve is opened and the system is purged slowly for 10 to 15 minutes at slightly above atmospheric pressure. During this time flow is established through both the vapor and liquid outlet lines 23 and 24. After the system is purged, the cell inlet, and vapor and liquid outlet valves are closed (53 and 57, 60 and 62, FIG. 5), and full cylinder pressure is applied to the potassium hydroxide-filled trap 38. The valves on the gage panel are then opened to permit reading the pressure on the appropriate gage, and pressure regulator 39 is set at the desired pressure, while the gas is slowly vented downstream from this gage.

A fifteen-liter container of liquefied gas, e.g., liquid air or nitrogen, is placed in position near the Dewar flask 54 and coolant is transferred thereto until the heaters 27 and 28 are immersed. To hasten further the cool-down of the cell, the temperature control circuit may be turned on and the contact 65 in recorder 64 set for the desired temperature. The coolant pumps (heaters 27 and 28, FIG. 1) are thereby activated and the cell is brought down rapidly to the neighborhood of the desired temperature. When the temperature is within a few degrees of the desired temperature, the coolant transfer circuit is placed in service for automatic control of the coolant level. For very rapid cool-down of the cell, automatic control of the coolant level in the Dewar is temporarily inactivated, and the lower end of the cell is immersed in coolant.

After about five minutes, during which minor variations in temperature disappear, cell inlet valve 53 is opened to admit gas to the cell. Conditions of temperature and pressure may be such that a liquid phase will form in the cell. The contents are then stirred to establish equilibrium and samples of the liquid and vapor are withdrawn via lines 56 and 59 into evacuated 50 cc. sample bottles and analyzed by means of a mass spectrometer.

In order to change to a new temperature and/or pressure, cell inlet valve 53 is closed and the liquids are discarded through the drain line 61. The cell pressure is allowed to drop to nearly atmospheric and then the vapor and liquid outlet lines are closed. New cell conditions are established and the experiment is repeated. The window 10 allows the operator to observe the conditions in the cell and avoid taking samples contaminated with unwanted phases.

Solid phase samples may also be taken with this apparatus when this phase is present. This can be done by allowing the liquid phase to drain off slowly leaving the solid phase deposited on the stirrer blade 77. The stirrer blade is then raised and the liquid outlet line is swept free of liquid. Next, the cell temperature is raised to the melting point of the solid and the resulting liquid is sampled through the liquid sampling line.

A modified form of the apparatus suitable for more elevated pressures is shown in FIGURE 6. In this modification the cell block consisting of metal section 101, front face plate 102, gaskets 103 and 104, window 105, bolts 106, opening 107 and liquid exit 108 correspond to the similar elements of FIGURE 2. Surrounding the cell block is a metal casing 109 in which a rectangular cut is machined, to fit the cell block closely. An opening, the boundary trace of which is 110, is made at the back portion of the casing to receive the helical gas entry tube 111 snugly, and allow sufficient space to braze the end of tube 111 to a fitting (not shown) threaded into hole 113 drilled through 101 to cell opening 107. The space around the coil is then filled with solder 112 to unitize the mass. Screws 114 fasten casing 109 to cell block 101. Holes 115 drilled in casing 109 are conduits for the coolant, having coolant pumps, as described in connection with FIGURE 1, connected near their lower portion. Conduits 116 are provided for coolant return. These may be simply saw cuts made in the casing 109, as shown in FIGURE 6. Heaters 117, similar to element 20 of FIGURE 2, are mounted in holes 118 drilled in the casing. Thermocouple wires 119 are mounted in one or more screws 114, and lead to a recorder of conventional design. The upper surface of each of the arm portions of casing 109 is machined so as to form a shallow rectangular reservoir 120 when the casing 109 is in abutting position with metal section 101, as shown in FIGURE 7. Cover 121 is mounted over the reservoir, and is fastened to 109 and 101 by means of screws 122.

Although the cell has been described in detail in connection with the embodiment for studying phase relationships of gases or mixtures of gases, it is obvious that the cell is capable of many other uses when a constant temperature chamber is required. It can be used for example for studying the physical, chemical, and electrical properties of gases, liquids, and solids at low temperatures. For example, temperatures may be as low as the nominal temperature of liquid nitrogen boiling at atmospheric pressure ($-320°$ F.), and extended to $-347°$ F. by conventional means simply by encapsulating the cell, Dewar flask, and associated equipment in a vacuum chamber, and reducing the pressure thereon by means of an external vacuum pump. Coolants other than liquid air or nitrogen may be employed, and with slight modification the cell may be adapted for operation at more elevated temperatures. It is apparent that many modifications of the invention described above are possible, and such modifications are intended to be covered in the appended claims.

We claim:

1. A phase equilibrium apparatus having a cell operable at any one of a range of constant temperatures extending from below the nominal temperature of liquid nitrogen to above normal ambient temperatures, comprising a metal chamber open on one side, a transparent viewing plate covering the opening, said transparent plate being mounted in gas-tight relationship with said chamber, gas inlet means located above the bottom of said chamber for admitting gas thereto, an outlet means at the upper portion of the chamber for removing gas therefrom, outlet means near the bottom of said chamber for removing liquid therefrom, at least one heating means adjacent the outer surface of said chamber and in heat exchange relationship therewith, said upper portion of the chamber including a reservoir means, a plurality of conduits having ends opening into the reservoir means, and extending downward to be adjacent said outer chamber surface and in heat exchange relationship therewith, means to deliver coolant liquid to said reservoir means whereby the coolant liquid is passed into the open ends of and through said conduits.

2. A phase equilibrium apparatus having a cell operable at any one of a range of constant temperatures extending from below the nominal temperature of liquid nitrogen to above normal ambient temperatures, comprising a metal chamber open at one side and having an inner and outer surface, a transparent viewing plate covering the opening, said transparent plate being mounted in gas-tight relationship with said chamber, inlet means above the bottom of said chamber for admitting fluid therein, outlet means at the lower end of the chamber for removing fluid therefrom, outlet means near the top of the chamber for removing vapors therefrom, fluid stirring means in said chamber, at least one heating means adjacent the outer surface and in heat exchange relationship therewith, at least one coolant delivering conduit in heat exchange relationship with said chamber, a plurality of coolant return conduits in heat exchange relationship with said chamber, said conduits and heating units being unitized with the chamber by being encased in a metal mass, said mass enveloping at least a part of the chamber outer surface, a reservoir near the top of said chamber, a container for coolant liquid below said chamber, means for forcing coolant liquid through said delivery conduit, said coolant liquid flowing therefrom into the reservoir, said return conduits being connected to the reservoir and adapted to return the coolant liquid to said coolant container, temperature sensing means mounted in said chamber, temperature control means coacting with said temperature sensing means and coolant forcing means for maintaining the chamber at a predetermined temperature.

3. A phase equilibrium apparatus having a cell operable at any one of a range of constant temperatures extending from below the nominal temperature of liquid nitrogen to above normal ambient temperatures, comprising a metal chamber having walls of appreciable thickness open at one side and having an inner and outer surface, a transparent viewing plate covering said opening, said transparent plate being in gas-tight relationship with said chamber, inlet means near the lower end of the said chamber for admitting fluid therein, outlet means at the lower end of the chamber for removing fluid therefrom, fluid stirring means in said chamber, coolant delivery conduit means in said chamber walls adjacent said chamber outer surface, a plurality of coolant return conduits in said chamber walls adjacent said chamber outer surface, at least one heating means adjacent the chamber outer surface and in heat exchange relationship therewith, reservoir means at the top of said chamber, a container for coolant liquid below said chamber, means for forcing liquid through said delivery conduit, said coolant liquid passing therethrough into the reservoir, said return conduits having one end at the said reservoir and adapted to return the coolant liquid to said coolant container, temperature sensing means adjacent said chamber, temperature control means coacting with said temperature sensing means and coolant forcing means for maintaining the chamber at a predetermined temperature.

4. A phase equilibrium apparatus having a cell operable at any one of a range of constant temperatures extending from below the nominal temperature of liquid nitrogen to above normal ambient temperatures, comprising a metal cell chamber open at one side and having inner and outer surfaces, a metal casing in heat exchange contact with the metal cell chamber outer surface, a viewing window covering the chamber opening, said window being in gas-tight relationship with said chamber, inlet means near the lower end of the said chamber for admitting fluid therein, outlet means at the lower end of the chamber for removing fluid therefrom, fluid stirring means in said chamber, coolant delivery conduits extending through said metal casing, a plurality of coolant return conduits extending through said metal casing, and coolant delivery and return conduits being spaced relatively adjacent the outer surface of the cell chamber, at least one heating means in said metal casing adjacent the cell chamber outer surface, reservoir means at the top of said metal casing, a container for coolant liquid below said chamber, means for forcing liquid through said delivery conduit, said coolant passing therethorugh into the reservoir, said return conduits having one end at the said reservoir and adapted to return the coolant liquid to the coolant container, temperature sensing means adjacent said chamber, temperature control means coacting with said temperature sensing means and coolant forcing means for maintaining the chamber at a predetermined temperature.

5. A phase equilibrium apparatus having a cell operable at any one of a range of constant temperatures extending from below the nominal temperature of liquid nitrogen to above normal ambient temperatures, comprising a chamber having an outer and inner surface, said surfaces comprising a transparent closure providing a view within the chamber, inlet and outlet means to the interior of said chamber around the bottom thereof, for admitting and removing fluid therefrom, at least one heat exchange liquid delivery conduit in heat exchange relationship with said chamber, a plurality of heat exchange liquid return conduits in heat exchange relationship with said chamber, a metal mass surrounding said conduits and enveloping at least a part of the outer surface of said chamber, whereby the chamber and conduits form a single unitary structure, a reservoir at the top of said metal mass, a container for heat exchange liquid, means for forcing heat exchange liquid from the said container through the delivery conduits into the reservoir, said return conduits being connected to the reservoir and adapted to return the heat exchange liquid to the container, means for maintaining the chamber at a predetermined temperature including a temperature sensing means for sensing the temperature in the chamber, means responsive to variations of the sensed temperature from a predetermined temperature for affecting the heat exchange liquid forcing means, whereby the chamber is restored to the predetermined temperature.

6. A phase equilibrium apparatus having a cell operable at any one of a range of constant temperatures extending from below the nominal temperature of liquid nitrogen to above normal ambient temperatures, comprising a chamber having an outer and inner surface, inlet and outlet means to the interior of said chamber around the bottom thereof, for admitting and removing fluid therefrom, a transparent viewing plate detachably mounted on said chamber and forming one face thereof, at least one heat exchange liquid delivery conduit in heat exchange relationship with said chamber, a plurality of heat exchange liquid return conduits in heat exchange relationship with said chamber, a metal mass surrounding said conduits and enveloping at least a part of the outer surface of said chamber, whereby the chamber and conduits form a single unitary structure, a reservoir at the top of said metal mass, a container for heat exchange liquid, means for driving heat exchange liquid from the said container through the delivery conduit into the reservoir, said return conduits being connected to the reservoir and adapted to return the heat exchange liquid to the container, means for maintaining the chamber at a predetermined temperature, including a temperature sensing means for sensing the temperatuer in the chamber, means responsive to variations of the sensed temperature from a predetermined temperature for affecting the heat exchange liquid driving means, whereby the chamber is restored to the predetermined temperature.

7. A phase equilibrium apparatus having a cell operable at any one of a range of constant temperatures extending from below the nominal temperature of liquid nitrogen to above normal ambient temperatures, comprising a metal chamber open at one side and having an outer and inner surface, a transparent viewing plate covering said opening, said transparent plate being detachably mounted in gas-tight relationship with said chamber, means for admitting fluid into said chamber, means for removing fluid from said chamber, stirring means located within said chamber, at least one heat exchange liquid delivery conduit in heat exchange with said chamber, a plurality of heat exchange liquid return conduits in heat exchange relationship with said chamber, a metal mass surrounding said conduits and enveloping at least a part of the outer surface of said chamber, whereby the chamber and conduits form a single unitary structure, a reservoir at the top of said metal mass, a container for heat exchange liquid, means for forcing heat exchange liquid from the said container through the delivery conduits into the reservoir, said return conduits being connected to the reservoir and adapted to return the heat exchange liquid to the container, means for maintaining the chamber at a predetermined temperature, including a temperature sensing means for sensing the temperature in the chamber, means responsive to variations of the sensed temperature from a predetermined temperature for affecting the heat exchange liquid forcing means, whereby the cell is restored to the predetermined temperature.

8. A phase equilibrium apparatus having a cell operable at any one of a range of constant temperatures extending from below the nominal temperature of liquid nitrogen to above normal ambient temperatures, comprising a metal chamber open at one side and having an outer and inner surface, and including a top surface, a transparent viewing plate covering said opening, said transparent plate being detchably mounted in gas-tight relationship with said chamber, means for admitting fluid into said chamber, means for removing fluid from said chamber, stirring means located within said chamber, at least one heat exchange liquid delivery conduit in heat exchange with said chamber, a plurality of heat exchange liquid return conduits in heat exchange relationship with said chamber, a metal mass surrounding said conduits and enveloping at least a part of the outer surface of said chamber, whereby the chamber and conduits form a single unitary structure, a reservoir at the top of said metal mass, the top surface of said mass forming the bottom of the reservoir, said heat exchange liquid delivery conduit extending above the bottom of the reservoir, the heat exchange liquid return conduits being connected to the reservoir at the bottom thereof, a container for heat exchange liquid, means for forcing heat exchange liquid from the said container through the delivery conduit into said reservoir, said return conduits being adapted to return the heat exchange liquid to the said container, means for maintaining the chamber at a predetermined temperature, including a temperature sensing means for sensing the temperature of the chamber, means responsive to variations of the sensed temperature from a predetermined temperature for affecting the heat exchange liquid forcing means, whereby the cell is restored to the predetermined temperature.

9. A phase equilibrium apparatus having a cell operable at any one of a range of constant temperatures extending from below the nominal temperature of liquid nitrogen to above normal ambient temperatures, comprising a metal chamber open at one side and having an outer and inner surface, and including a top and bottom surface, a transparent viewing plate covering the said opening, said transparent plate being detachably mounted in gas-tight relationship with said chamber, means for admitting fluid into said chamber, means for removing fluid from said chamber, stirring means located within said chamber, at least one coolant exchange liquid delivery conduit in heat exchange relationship with said chamber, a metal mass surrounding said conduits and enveloping at least a part of the outer surface of said chamber whereby the chamber heater and conduits form a single unitary structure, a reservoir at the top of said metal mass, the top surface of said mass forming the bottom of the reservoir, said coolant exchange liquid delivery conduit extending above the top surface of the chamber and below the bottom surface of the said chamber, the said return conduits being connected to the reservoir at the bottom thereof, a container for coolant liquid spaced below said chamber and in relatively close proximity thereto, said coolant delivery conduit extending below the surface of the coolant liquid, electrical heater means mounted in the lower end of said coolant delivery conduit and immersed in the coolant liquid, said heater means being adapted to force coolant liquid through the delivery conduit into the reservoir, means for maintaining the chamber at a predetermined temperature including a temperature sensing means for sensing the temperature of the chamber, means responsive to variations of the sensed temperature from a predetermined temperature for controlling the electrical current flow to said electrical heater means, whereby the cell is restored to the predetermined temperature.

10. A phase equilibrium apparatus having a cell operable at any one of a range of constant temperatures extending from below the nominal temperature of liquid nitrogen to above normal ambient temperatures, comprising a metal chamber open at one side and having an outer and inner surface, including top and bottom outer surfaces, a transparent viewing plate covering the said opening, said transparent plate being detachably mounted in gas-tight relationship with said chamber, means for admitting fluid into said chamber, means for removing fluid from said chamber, stirring means located within said chamber, at least one coolant exchange liquid delivery conduit in heat exchange relationship with said chamber, at least one first electrical heating means adjacent the outer surface and in heat exchange relationship therewith, a metal mass surrounding said conduits and enveloping at least a part of the outer surface of said chamber whereby the chamber heater and conduits form a single unitary structure, a reservoir at the top of said metal mass, the top surface of said chamber forming the bottom of the reservoir, said coolant liquid delivery conduit extending above the top surface of the chamber and below the bottom surface of the said chamber, the said return conduits being connected to the reservoir at the bottom thereof, a container for coolant liquid spaced below said chamber, and in relative close proximity thereto, said coolant delivery conduit extending below the surface of the coolant liquid, second electrical heater means mounted in the lower end of said coolant delivery conduit, and immersed in the coolant liquid, said heater means being adapted to force coolant liquid through the delivery conduit into the reservoir, means for maintaining the chamber at a predetermined temperature including a temperature sensing means for sensing the temperature of the chamber, means responsive to variations of the sensed temperature from a predetermined temperature for controlling the electrical current flow to said first and second electrical heater means, whereby the cell is restored to the predetermined temperature.

References Cited in the file of this patent

UNITED STATES PATENTS

| | | |
|---|---|---|
| 2,142,856 | Lieb et al. | Jan. 3, 1939 |
| 2,612,357 | Parks | Sept. 30, 1952 |
| 2,662,393 | Rzasa | Dec. 15, 1953 |
| 2,966,055 | Tracht et al. | Dec. 27, 1960 |